United States Patent
Hatasawa

(10) Patent No.: US 8,331,676 B2
(45) Date of Patent: Dec. 11, 2012

(54) IMAGE PROCESSING APPARATUS AND METHOD, AND PROGRAM

(75) Inventor: Yasunari Hatasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1164 days.

(21) Appl. No.: 12/185,356

(22) Filed: Aug. 4, 2008

(65) Prior Publication Data

US 2009/0041362 A1    Feb. 12, 2009

(30) Foreign Application Priority Data

Aug. 10, 2007 (JP) ................ P2007-208947
Jan. 31, 2008 (JP) ................ P2008-020335

(51) Int. Cl.
  G06K 9/00      (2006.01)
  G06K 9/64      (2006.01)
  G06K 9/32      (2006.01)
  H04N 3/27      (2006.01)
  H04N 5/44      (2011.01)
  H04N 5/46      (2006.01)

(52) U.S. Cl. ........ 382/181; 382/278; 382/293; 382/298; 348/554; 348/558; 348/559

(58) Field of Classification Search ............ 382/278, 382/181, 293, 298; 348/554, 558, 559
See application file for complete search history.

(56) References Cited

U.S. PATENT DOCUMENTS 5,757,421 A * 5/1998 Kato et al. ............... 348/97
7,082,161 B2 * 7/2006 Sumiyoshi et al. ....... 375/240.01
7,982,805 B2 * 7/2011 Caviedes et al. ......... 348/558
2004/0130619 A1   7/2004 Lin
2007/0070196 A1   3/2007 Caviedes et al.
2007/0104273 A1   5/2007 Jia et al.

FOREIGN PATENT DOCUMENTS

JP    2006-053766    2/2006

OTHER PUBLICATIONS

English-lauguage European Search Report from the European Patent Office in corresponding European Application No. 0825 2596 dated Dec. 6, 2011.

* cited by examiner

Primary Examiner — Matthew Bella
Assistant Examiner — Jose M Torres
(74) Attorney, Agent, or Firm — Finnegan, Henderson, Farabow, Garrett & Dunner, L.L.P.

(57) ABSTRACT

An image processing apparatus includes: a correlation value computing section that computes a correlation value between pixels in a noted image and its preceding and following reference images; a break determining section that determines a break in identical images based on the correlation value between pixels; a successive occurrence counting section that cumulatively counts successive occurrences of identical images as a successive occurrence count, if the noted image is not determined as corresponding to a break; a pattern determining section that determines whether or not the successive occurrence count and a set count match, if the noted image is determined as corresponding to a break; a matching counting section that counts up a matching count if it is determined that the successive occurrence count and the set count match; and a pull-down pattern detecting section that detects a predetermined pull-down pattern if the matching count exceeds a predetermined count.

19 Claims, 9 Drawing Sheets

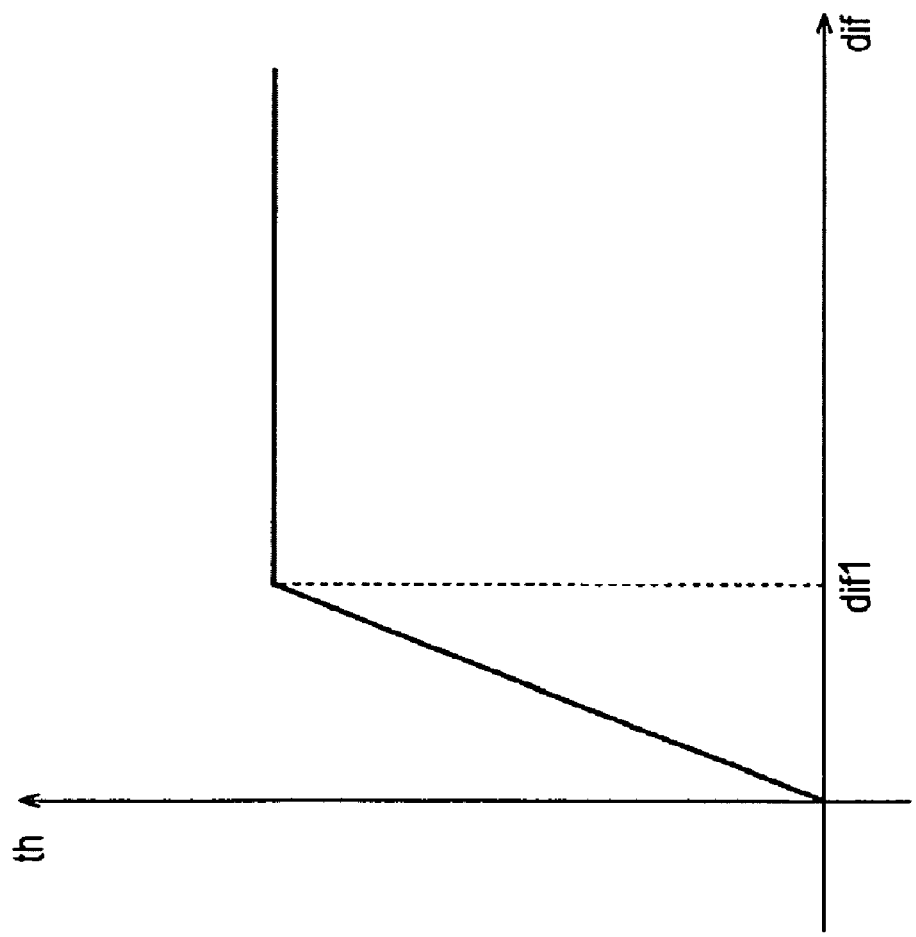

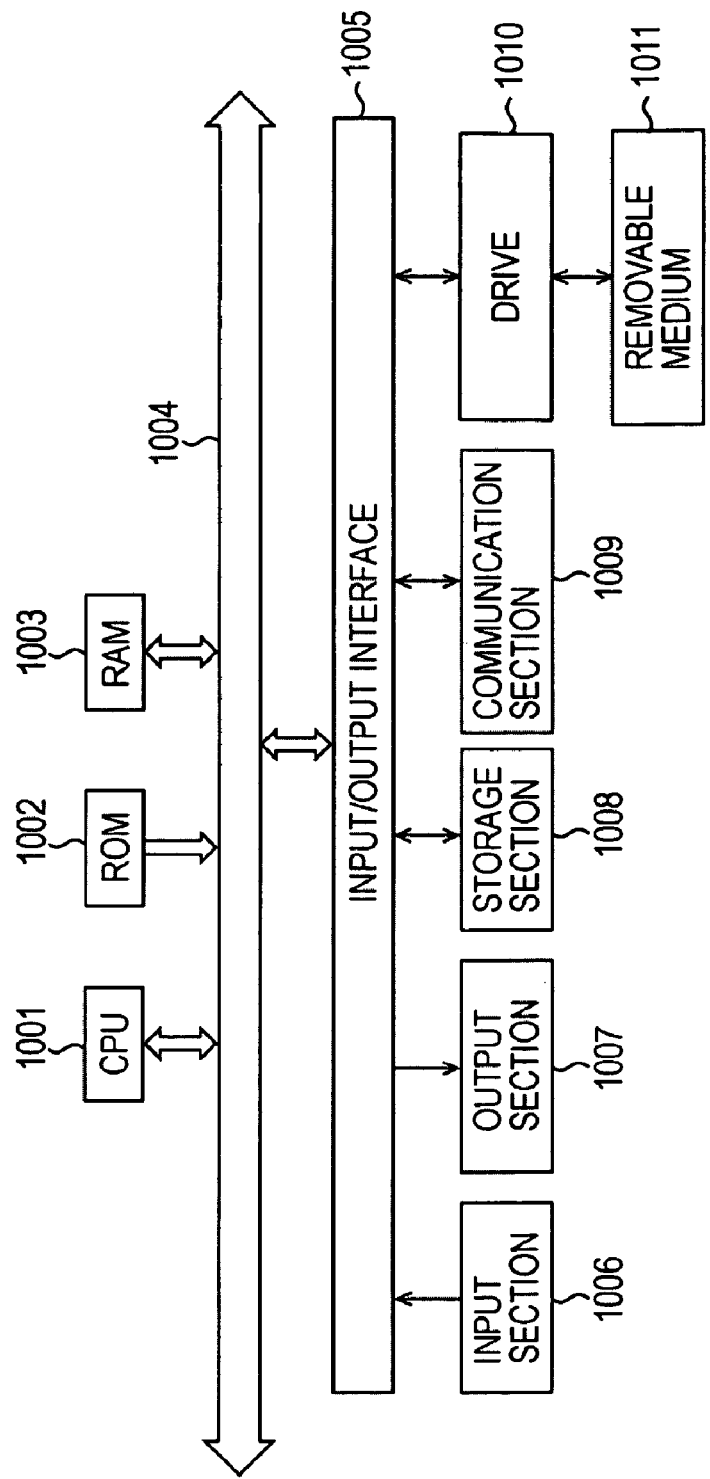

IMAGE PROCESSING APPARATUS AND METHOD, AND PROGRAM

CROSS REFERENCES TO RELATED APPLICATIONS

The present invention contains subject matter related to Japanese Patent Application JP 2007-208947 and JP 2008-020335 filed in the Japanese Patent Office on Aug. 10, 2007 and Jan. 31, 2008, respectively, the entire contents of which are incorporated herein by reference.

BACKGROUND OF THE INVENTION

1. Field of the Invention

The present invention relates to an image processing apparatus and method, and a program. More specifically, the present invention relates to an image processing apparatus and method, and a program which enable detection of various pull-down patterns.

2. Description of the Related Art

Techniques for converting a frame rate are becoming increasingly commonplace.

As a representative example of such techniques, there has been proposed a technique whereby the frame rate of 24 fps (Frame Per Second) used in film is converted into the frame rate of 30 ftp used in television by a pull-down process called 2-3 pull-down (see, for example, Japanese Unexamined Patent Application Publication No. 2006-253766).

According to the 2-3 pull-down process, for example, the image of the first frame of a film is used for the first and second fields of a television image, the image of the second frame of the film is used for the third to fifth fields of the television image, the image of the third frame of the film is used for the sixth and seventh fields of the television image, and the image of the fourth frame of the film is used for the eighth to tenth fields of the television image. By sequentially repeating this process, the frame rate of 24 fps is converted into 30 fps. In this case, the odd-numbered fields are top fields, and the even-numbered fields are bottom fields. A one frame of television image is generated by a succession of an odd-numbered field and an even-numbered field. There are also other types of pull-down pattern, such as 2-2 pull-down.

SUMMARY OF THE INVENTION

However, processing corresponding to a case where the frame rate of the original progressive image is smaller than 24 fps, like 8-7 pull-down, 6-4 pull-down, or 5-5 pull-down, needs to be detected by a different configuration, which may not only add complexity to the configuration of the apparatus but also lead to an increase in cost.

It is thus desirable to enable detection of pull-down patterns by a single process configuration, particularly with respect to input images of various frame rates.

An image processing apparatus according to an embodiment of the present invention includes: correlation value computing means for computing a correlation value between a noted image and each of reference images preceding and following the noted image, among successively inputted images; break determining means for determining whether or not the noted image corresponds to a break in a predetermined number of successive identical images, on the basis of the correlation value; successive occurrence counting means for cumulatively counting successive occurrences of identical images as a successive occurrence count, if it is not determined that the noted image corresponds to a break; pattern determining means for determining whether or not a successive occurrence count up to an immediately preceding image matches a set count indicating a successive occurrence count corresponding to a predetermined pull-down pattern, if it is determined that the noted image corresponds to a break; matching counting means for counting a number of times matching with the predetermined pull-down pattern occurs as a matching count, if it is determined that the noted image corresponds to a break, and it is determined that the successive occurrence count up to the immediately preceding image matches the set count; and pull-down pattern detecting means for detecting the predetermined pull-down pattern corresponding to the set count as a pull-down pattern of the successively inputted images, if it is determined that the noted image corresponds to a brake, and it is determined that the successive occurrence count up to the immediately preceding image matches the set count and that the matching count is larger than a predetermined count.

The image processing apparatus may be configured to further include progressive image generating means for generating a progressive image from the successively inputted images, on the basis of the pull-down pattern of the successively inputted images detected by the pull-down pattern detecting means.

The pull-down pattern detecting means may be configured such that, if it is determined that the noted image corresponds to a break, the pull-down pattern detecting means suspends detection of the predetermined pull-down pattern if it is determined that the successive occurrence count up to the immediately preceding image matches the set count, and the matching count is not larger than a predetermined count and is larger than another predetermined count smaller than the predetermined count.

The break determining means may be configured to determine whether or not the noted image corresponds to a break in a predetermined number of successive identical images, on the basis of whether or not the correlation value is larger than a predetermined threshold, or a comparison result between correlation values.

The image processing apparatus may be configured to further include threshold management means for managing the predetermined threshold so as to become smaller in accordance with the successive occurrence count.

The correlation value computing means may be configured to compute a correlation value between pixels in a first area in the vicinity of the center of each of the noted image and the reference images preceding and following the noted image, among successively inputted images, and to compute a correlation value between pixels in a second area that is larger than the first area and is in the vicinity of the center of each of the noted image and the reference images preceding and following the noted image, among successively inputted images, in a state when the pull-down pattern detecting means is able to detect the predetermined pull-down pattern.

An image processing method according to an embodiment of the resent invention includes the steps of: computing a correlation value between a noted image and each of reference images preceding and following the noted image, among successively inputted images; determining whether or not the noted image corresponds to a break in a predetermined number of successive identical images, on the basis of the correlation value; cumulatively counting successive occurrences of identical images as a successive occurrence count, if it is not determined that the noted image corresponds to a break; determining whether or not a successive occurrence count up to an immediately preceding image matches a set count indicating a successive occurrence count corresponding to a predetermined pull-down pattern, if it is determined that the noted image corresponds to a break; counting a number of times matching with the predetermined pull-down pattern occurs as a matching count, if it is determined that the noted image corresponds to a break, and it is determined that the successive occurrence count up to the immediately preceding image matches the set count; and detecting the predetermined pull-down pattern corresponding to the set count as a pull-down pattern of the successively inputted images, if it is determined that the noted image corresponds to a brake, and it is determined that the successive occurrence count up to the immediately preceding image matches the set count and that the matching count is larger than a predetermined count.

A program according to an embodiment of the present invention causes a computer to execute a process including the steps of: computing a correlation value between a noted image and each of reference images preceding and following the noted image, among successively inputted images; determining whether or not the noted image corresponds to a break in a predetermined number of successive identical images, on the basis of the correlation value; cumulatively counting successive occurrences of identical images as a successive occurrence count, if it is not determined that the noted image corresponds to a break; determining whether or not a successive occurrence count up to an immediately preceding image matches a set count indicating a successive occurrence count corresponding to a predetermined pull-down pattern, if it is determined that the noted image corresponds to a break; counting a number of times matching with the predetermined pull-down pattern occurs as a matching count, if it is determined that the noted image corresponds to a break, and it is determined that the successive occurrence count up to the immediately preceding image matches the set count; and detecting the predetermined pull-down pattern corresponding to the set count as a pull-down pattern of the successively inputted images, if it is determined that the noted image corresponds to a brake, and it is determined that the successive occurrence count up to the immediately preceding image matches the set count and that the matching count is larger than a predetermined count.

A program storing medium according to an embodiment of the present invention stores the program mentioned above.

In an image processing apparatus according to an embodiment of the present invention, among successively inputted images, a correlation value between a noted image and each of reference images preceding and following the noted image is computed; on the basis of the correlation value, it is determined whether or not the noted image corresponds to a break in a predetermined number of successive identical images; successive occurrences of identical images are counted as a successive occurrence count if it is not determined that the noted image corresponds to a break; it is determined whether or not a successive occurrence count up to an immediately preceding image matches a set count indicating a successive occurrence count corresponding to a predetermined pull-down pattern, if it is determined that the noted image corresponds to a break; the number of times matching with the predetermined pull-down pattern occurs is counted as a matching count, if it is determined that the noted image corresponds to a break, and it is determined that the successive occurrence count up to the immediately preceding image matches the set count; and the predetermined pull-down pattern corresponding to the set count is determined to be a pull-down pattern of the successively inputted images, if it is determined that the noted image corresponds to a brake, and it is determined that the successive occurrence count up to the immediately preceding image matches the set count and that the matching count is larger than a predetermined count.

The image processing apparatus according to an embodiment of the present invention may be an independent apparatus or may be a block that performs image processing.

According to an embodiment of the present invention, pull-down patterns can be detected by a single process configuration with respect to input images of various frame rates, thereby making it possible to reconstruct the original progressive image with high accuracy from input images on the basis of the detected pull-down patterns.

BRIEF DESCRIPTION OF THE DRAWINGS

FIG. 9 is a diagram illustrating the setting of a predetermined threshold used for determining a break; and FIG. 10 is a diagram showing an example of the configuration of a personal computer.

DESCRIPTION OF THE PREFERRED EMBODIMENTS

Before describing an embodiment of the present invention, the correspondence between the features of the present invention and embodiments disclosed in this specification is discussed below. This description is intended to assure that an embodiment(s) supporting the present invention are described in this specification. Thus, even if an embodiment in the following description is not described as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

Furthermore, this description is not intended to provide an exhaustive description of all of the aspects of the present invention. That is, the description does not deny the existence of aspects of the present invention that are described in this specification but not claimed in this application, i.e., the existence of aspects of the present invention that in future may be claimed by a divisional application, or that may be additionally claimed through amendments.

Figure 1:
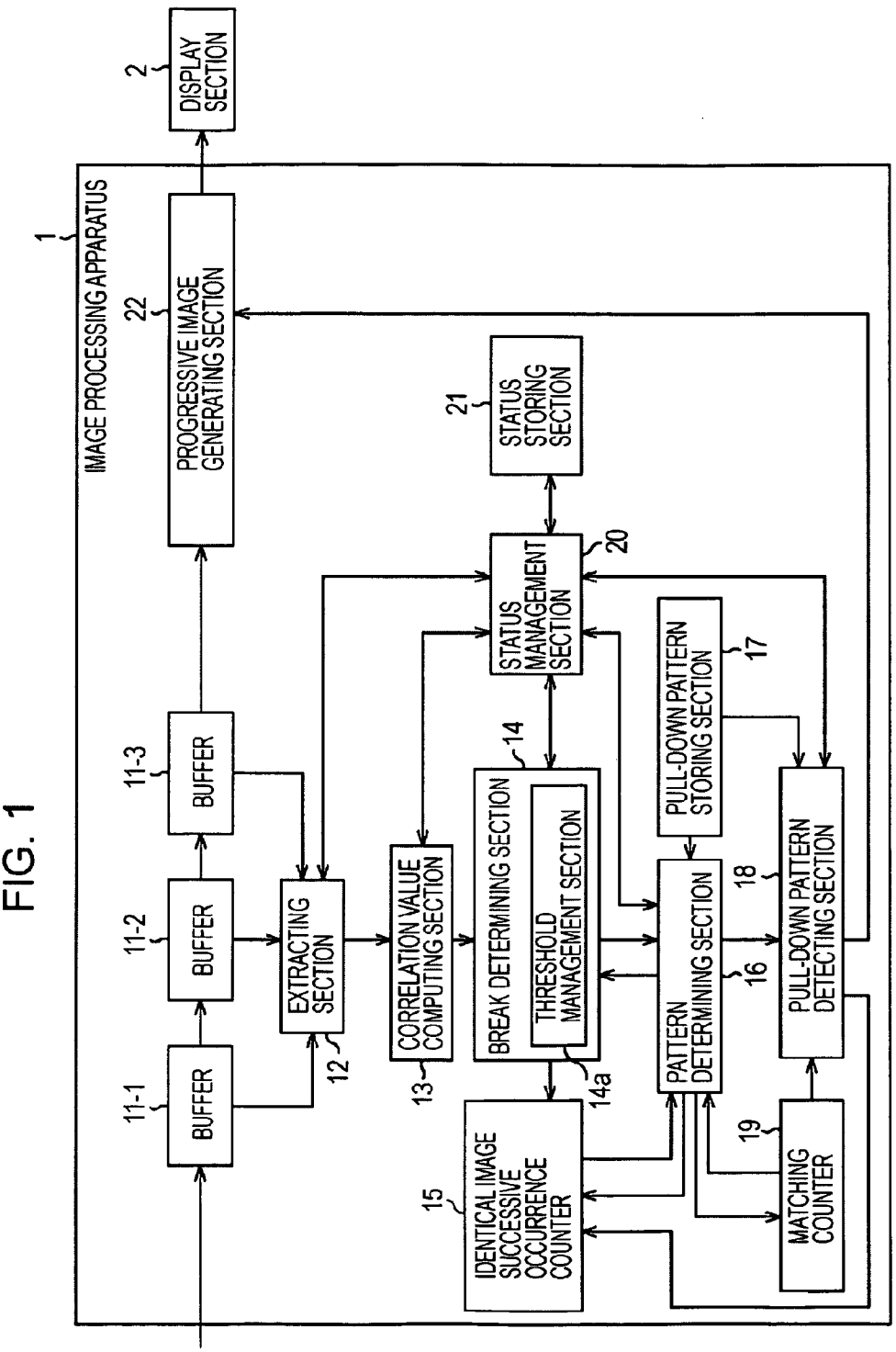
FIG. 1 is a block diagram showing an example of the configuration of an image processing apparatus according to an embodiment of the present invention.

That is, an image processing apparatus according to an embodiment of the present invention includes: correlation value computing means (for example, a correlation value computing section 13 in FIG. 1) for computing a correlation value between a noted image and each of reference images preceding and following the noted image, among successively inputted images; break determining means (for example, a break determining section 14 in FIG. 1) for determining whether or not the noted image corresponds to a break in a predetermined number of successive identical images, on the basis of the correlation value; successive occurrence counting means (for example, an identical image successive occurrence counter 15 in FIG. 1) for cumulatively counting successive occurrences of identical images as a successive occurrence count, if it is not determined that the noted image corresponds to a break; pattern determining means (for example, a pattern determining section 16 in FIG. 1) for determining whether or not a successive occurrence count up to an immediately preceding image matches a set count indicating a successive occurrence count corresponding to a predetermined pull-down pattern, if it is determined that the noted image corresponds to a break; matching counting means (for example, a matching counter 19 in FIG. 1) for counting a number of times matching with the predetermined pull-down pattern occurs as a matching count, if it is determined that the noted image corresponds to a break, and it is determined that the successive occurrence count up to the immediately preceding image matches the set count; and pull-down pattern detecting means (for example, a pull-down pattern detecting section 18 in FIG. 1) for detecting the predetermined pull-down pattern corresponding to the set count as a pull-down pattern of the successively inputted images, if it is determined that the noted image corresponds to a brake, and it is determined that the successive occurrence count up to the immediately preceding image matches the set count and that the matching count is larger than a predetermined count.

The image processing apparatus may be configured to further include progressive image generating means (for example, a progressive image generating section 22 in FIG. 1) for generating a progressive image from the successively inputted images, on the basis of the pull-down pattern of the successively inputted images detected by the pull-down pattern detecting means.

The pull-down pattern detecting means (for example, a pull-down pattern detecting section 18 in FIG. 1) may be configured such that, if it is determined that the noted image corresponds to a break, the pull-down pattern detecting means suspends detection of the predetermined pull-down pattern if it is determined that the successive occurrence count up to the immediately preceding image matches the set count, and the matching count is not larger than a predetermined count and is larger than another predetermined count smaller than the predetermined count.

The break determining means (for example, a break determining section 14 in FIG. 1) may be configured to determine whether or not the noted image corresponds to a break in a predetermined number of successive identical images, on the basis of whether or not the correlation value is larger than a predetermined threshold, or a comparison result between correlation values.

The image processing apparatus may be configured to further include threshold management means (for example, a threshold management section 14a in FIG. 1) for managing the predetermined threshold so as to become smaller in accordance with the successive occurrence count.

The correlation value computing means (for example, a correlation value computing section 13 in FIG. 1) may be configured to compute a correlation value between pixels in a first area in the vicinity of the center of each of the noted image and the reference images preceding and following the noted image, among successively inputted images, and to compute a correlation value between pixels in a second area that is larger than the first area and is in the vicinity of the center of each of the noted image and the reference images preceding and following the noted image, among successively inputted images, in a state when the pull-down pattern detecting means is able to detect the predetermined, pull-down pattern.

Figure 7:
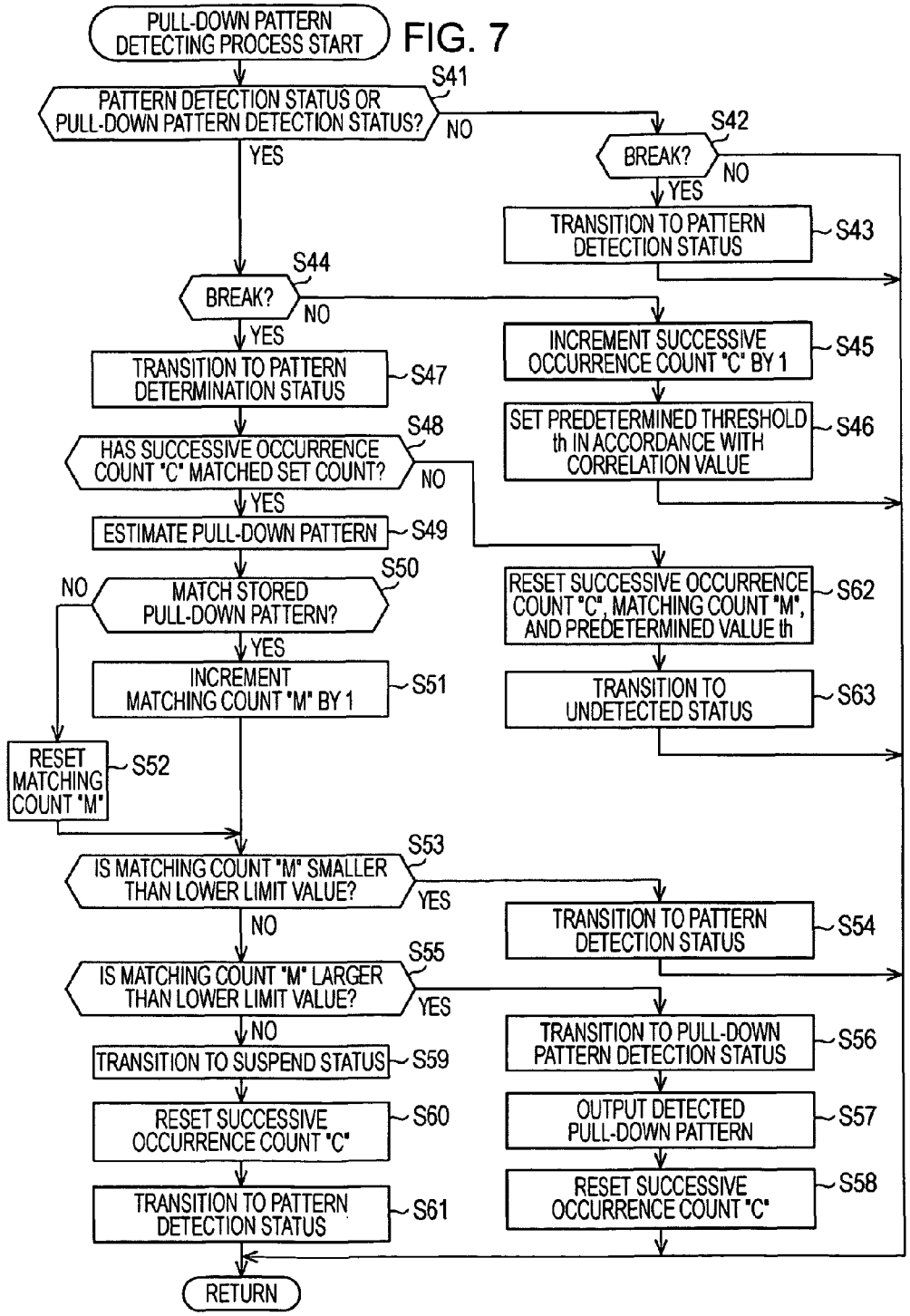
FIG. 7 is a flowchart illustrating a pull-down pattern detecting process.

An image processing method according to an embodiment of the resent invention includes the steps of: computing a correlation value between a noted image and each of reference images preceding and following the noted image, among successively inputted images (for example, steps S22 and S23 in FIG. 4); determining whether or not the noted image corresponds to a break in a predetermined number of successive identical images, on the basis of the correlation value (for example, steps S42 and S44 in FIG. 7); cumulatively counting successive occurrences of identical images as a successive occurrence count, if it is not determined that the noted image corresponds to a break (for example, step S45 in FIG. 7); determining whether or not a successive occurrence count up to an immediately preceding image matches a set count indicating a successive occurrence count corresponding to a predetermined pull-down pattern, if it is determined that the noted image corresponds to a break (for example, step S48 in FIG. 7); counting a number of times matching with the predetermined pull-down pattern occurs as a matching count, if it is determined that the noted image corresponds to a break, and it is determined that the successive occurrence count up to the immediately preceding image matches the set count (for example, step S51 in FIG. 7); and detecting the predetermined pull-down pattern corresponding to the set count as a pull-down pattern of the successively inputted images, if it is determined that the noted image corresponds to a brake, and it is determined that the successive occurrence count up to the immediately preceding image matches the set count and that the matching count is larger than a predetermined count (for example, step S57 in FIG. 7).

FIG. 1 shows an image processing apparatus according to an embodiment of the present invention.

An image processing apparatus 1 in FIG. 1 detects a pull-down pattern from input images forming a moving image of a predetermined frame rate, and further generates a progressive image from the input images on the basis of the detected pull-down pattern and displays the progressive image on a display section 2 formed by an LCD (Liquid Crystal Display) or the like.

Buffers 11-1 to 11-3 sequentially store input images on a field by field basis, and supply the stored input images to the buffers 11-2 and 11-3, and a progressive image generating section 22 on the downstream side. Through this processing, three successive field images are always accumulated in the buffers 11-1 to 11-3. It should be noted that as field images, top field images and bottom field images are sequentially supplied in alternation, and a top field image and a bottom field image form a single frame image.

An extracting section 12 extracts pixel values of pixels in an area in the vicinity of the central portion of each of field images respectively stored in the buffers 11-1 to 11-3, and supplies the pixel values to a correlation value computing section 13. Further, the extracting section 12 switches the range of the extraction area in the vicinity of the central portion, on the basis of status information supplied from a status management section 20. It should be noted that a detailed description will be given later of status information, and the range of the extraction area in the vicinity of the central portion based on the status information.

The correlation value computing section 13 computes, as a correlation value, the sum of absolute differences of pixels at the same position between a field image that is stored in the buffer 11-2 as a noted field image, and each of its preceding and following field images (hereinafter, also referred to as the reference field image) stored in the buffers 11-1 and 11-3, on the basis of the pixel values of pixels in the vicinity of the centers of the three field images supplied from the extracting section 12, and supplies the computed correlation value to a break determining section 14. More specifically, since the noted field image and the reference field image are respectively a top field image and a bottom field image, their pixel positions differ from each other. Accordingly, on the basis of each pixel of the noted field, the correlation value computing section 13 interpolates a pixel at the same position as each pixel of the reference field image, and computes a correlation value by using the sum of absolute pixel differences using the interpolated pixel and each corresponding pixel. Further, the correlation value computing section 13 also computes a different correlation value by using the sum of absolute pixel differences of pixels at the same position between reference fields.

The break determining section 14 compares the correlation values supplied from the correlation value computing section 13 against a threshold, thereby determining whether or not the noted field image as the processing target corresponds to a break. If a break is detected, the break determining section 14 notifies a pattern detecting section 16 of information indicating that a break has been detected. If a break is not detected, the break determining section 14 causes an identical image successive occurrence counter 15 to count up a successive occurrence count indicating the number of successive occurrences in which the same image as the immediately preceding field image is detected, and to reset the successive occurrence count when a break is detected. Further, the break determining section 14 includes a threshold management section 14a. The threshold management section 14a varies the threshold in accordance with the successive occurrence count stored in the identical image successive occurrence counter 15.

Here, a break will be described. For example, if the pull-down pattern is 2-3 pull-down, identical field images are repeated alternately two times, three times, two times, three times, and so on. At this time, when the correlation value is small, the break determining section 14 regards this as indicating successive occurrences of field images identical to the immediately preceding field image, whereas when the correlation value is large, the break determining section 14 regards a field image at the top position where a successive set of two or three identical field images switches to the next successive set of two or three identical field images as a break. Accordingly, in a case where the pull-down pattern is 2-3 pull-down, a field image corresponding to a break is detected after two successive occurrences of identical field images, and a field image corresponding to a break is detected again after three successive occurrences of identical field images from the above-mentioned field image, and the same processing is repeated thereafter.

Upon being notified of the fact that a field image corresponding to a break has been detected by the break determining section 14, the pattern determining section 16 determines, on the basis of a successive occurrence count up to the immediately preceding field image, whether or not a set count indicating a successive occurrence count corresponding to a pull-down pattern stored in a pull-down pattern storing section 17, and the above-mentioned successive occurrence count match, thereby determining whether or not the number of successive occurrences of identical field images immediately before the field image corresponding to a break matches the pull-down pattern.

If the pattern determining section 16 determines that the number of successive occurrences of identical field images immediately before the field image corresponding to a break matches the pull-down pattern, the pattern determining section 16 causes a matching counter 19 to store information on a matching count indicating the number of matchings with the pull-down pattern. Further, the pattern determining section 16 notifies a pull-down pattern detecting section 18 of the fact that a pull-down pattern with which the successive occurrence count matches has been detected. That is, for example, various pull-down patterns are registered in the pull-down pattern storing section 17 in advance and, of course, 2-3 pull-down is registered in advance. Accordingly, when the successive occurrence count at the time when a break is detected is 2 or 3, the pattern determining section 16 regards this as indicating that a matching pattern exists, and causes the matching counter 19 to count up a matching count with respect to the 2-3 pull-down. It should be noted, however, that in a case where the successive occurrence count is 2, if, for example, 2-2 pull-down or the like is registered in advance as a pull-down pattern, it may be difficult to identify which one of the pull-down patterns the successive occurrence count indicates. Accordingly, the matching count is counted up by the matching counter 19 for both of the pull-down patterns, and compared against a pull-down pattern registered until immediately before, thereby determining whether the pull-down pattern is 2-2 pull-down pattern or 2-3 pull-down. In the pull-down pattern storing section 17, various pull-down patterns such as 8-7 pull-down, 6-4 pull-down, and 5-5 pull-down are stored in advance in addition to 2-3 pull-down.

Upon being notified of the fact that a pull-down pattern has been detected by the pattern detecting section 16, the pull-down pattern detecting section 18 queries the matching counter 19 to reads information on the number of times matching has occurred for every pull-down pattern, that is, the matching count, and information on the corresponding pull-down pattern. When matching has occurred a number of times greater than a predetermined number of times, the pull-down pattern detecting section 18 regards the corresponding pull-down pattern as being the pull-down pattern of input images, and supplies the detected pull-down pattern of input images to the progressive image generating section 22.

Figure 2:
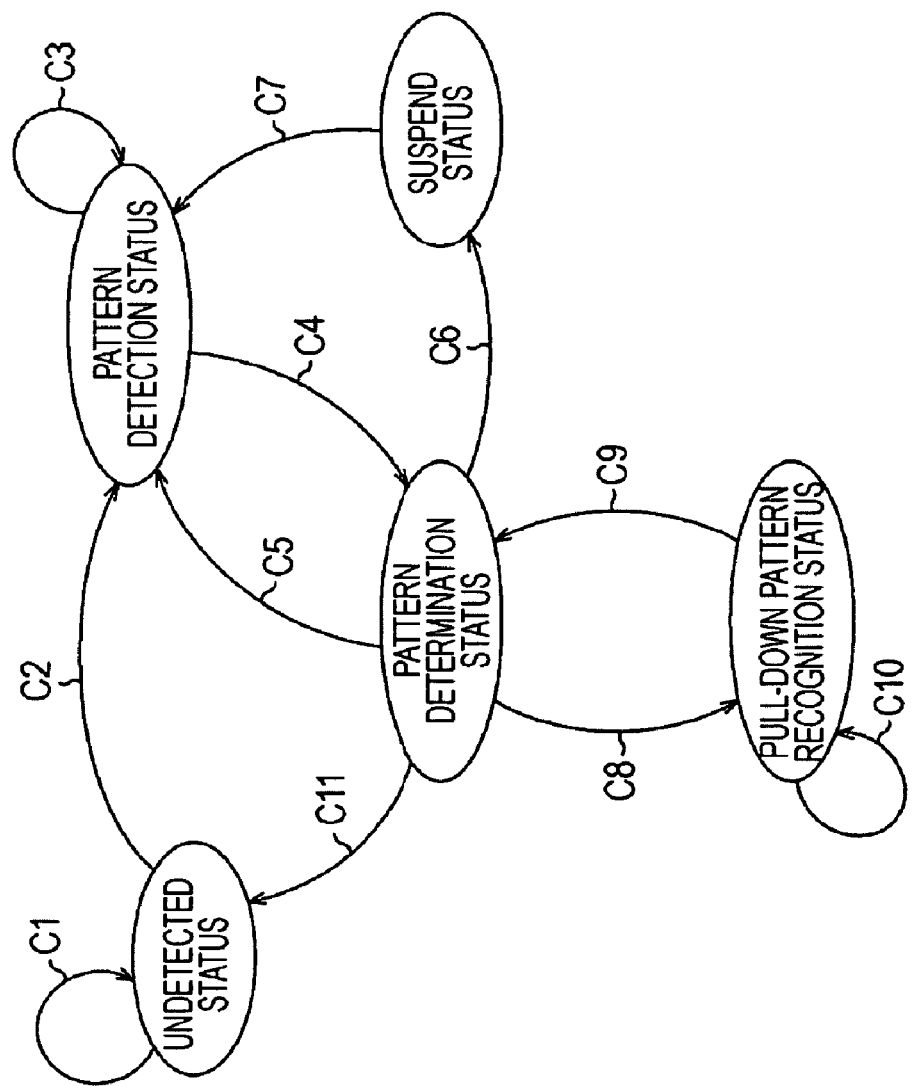
FIG. 2 is a status transition diagram illustrating image processing.

The status management section 20 manages the operation status by causing the status to transition to the undetected status, pattern detection status, pattern determination status, pull-down pattern recognition status, and suspend status shown in FIG. 2, in accordance with the operation status of each of the extracting section 12, the correlation value computing section 13, the break determining section 14, the pattern determining section 16, and the pull-down pattern detecting section 18.

The undetected status refers to a status in which a break is not found at all. When a break is detected, the undetected status transitions to the pattern detection status.

The pattern detection status refers to a status in which after the first break is detected, the next break is not detected, and thus a pattern constituting a pull-down pattern has not been detected. After a break is detected, the pattern detection status transitions to the pattern determination status.

The pattern determination status refers to a determination status for detecting a pattern constituting a pull-down pattern on the basis of the number of times the successive occurrence count of identical field images between two breaks matches the pull-down pattern, that is, a matching count. When the matching count is larger than an upper limit value, the status transitions to the pull-down pattern recognition status. When the matching count is smaller than a lower limit value, the status transitions to the pattern detection status. When the matching count is smaller than the upper limit value and larger than the lower limit value, the status transitions to the pattern detection status via the suspend status. When the successive occurrence count matches none of pull-down patterns, the status transitions to the undetected status.

On the basis of a pull-down pattern supplied from the pull-down pattern detecting section 18, the progressive image generating section 22 converts input images sequentially supplied from the buffer 11-3 to generate a progressive image for display on the display section 2.

Next, referring to the flowchart in FIG. 3, a description will be given of a progressive image generating process carried out by the image processing apparatus 1 in FIG. 1.

In step S1, the buffers 11-1 to 11-3 determine whether or not field images have been supplied, and the same determination process is repeated until field images are supplied. In step S1, if, for example, field images have been sequentially supplied, the processing advances to step S2.

In step S2, the buffers 11-1 to 11-3 store the sequentially supplied field images, and supplies previously stored field images to the downstream side. That is, the buffer 11-1 stores a field image that has been inputted and, at the same time, supplies a field image that had been stored until immediately before to the buffer 11-2. The buffer 11-2 stores a field image that has been supplied from the buffer 11-1 and, at the same time, supplies a field image that had been stored until immediately before to the buffer 11-3. The buffer 11-3 stores a field image that has been supplied from the buffer 11-2 and, at the same time, supplies a field image that had been stored until immediately before to the progressive image generating section 22. It should be noted that since no field image is supplied to the buffers 11-2 and 11-3 at the first processing, substantive processing begins after at least three field images are supplied.

In step S3, the extracting section 12 and the correlation value computing section 13 execute a correlation value computing process to compute the correlation value of a field image stored in the buffer 11-2 as the processing target, as the correlation value of a noted field image.

Figure 4:
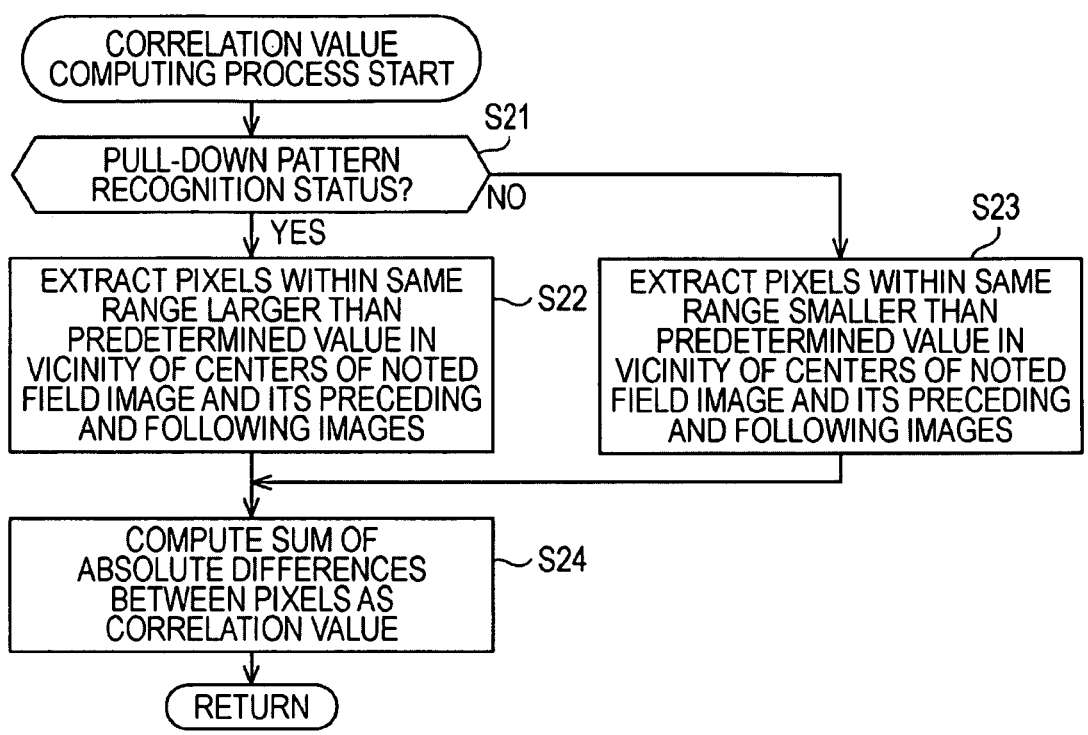
FIG. 4 is a flowchart illustrating a correlation value computing process.

Now, referring to the flowchart in FIG. 4, a description will be given of the correlation value computing process.

In step S21, the extracting section 12 queries the status management section 20 to determine whether or not the current status is the pull-down pattern recognition status. For example, if the status management section 20 queries the status storing section 21 to read status information, and the status information thus read indicates that the current status is the pull-down pattern recognition status, in step S22, the extracting section 12 extracts, from the buffers 11-1 to 11-3, pixels within an area larger than a predetermined value in the vicinity of the centers of a noted field image and field images preceding and following the noted field image, and supplies the extracted pixels to the correlation value computing section 13.

On the other hand, if, for example, the status information indicates that the current status is not the pull-down pattern recognition status, in step S23, the extracting section 12 extracts, from the buffers 11-1 to 11-3, pixels within an area smaller than a predetermined value in the vicinity of the centers of the noted field image and field images preceding and following the noted field image, and supplies the extracted pixels to the correlation value computing section 13.

Figure 5:
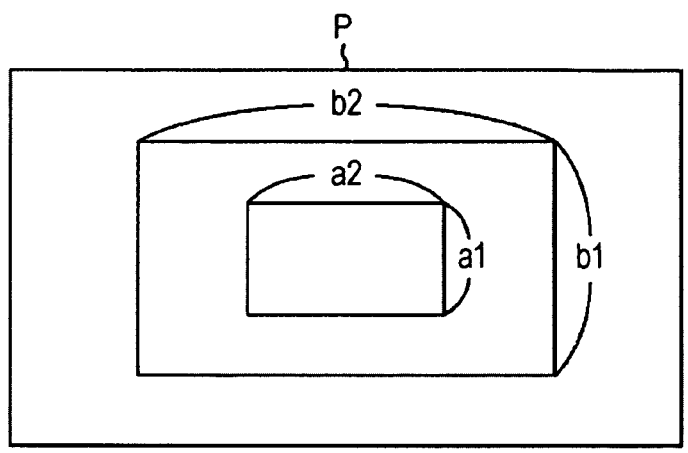
FIG. 5 is a diagram illustrating a correlation value computing process.

That is, if the current status is not the pull-down pattern recognition status, this means that a pull-down pattern has not been successfully detected. Accordingly, for example, as shown in FIG. 3, pixels within an area of a1×a2 smaller than a predetermined value in the vicinity of the center of a field image P are extracted. This is due to the following reason. That is, in an area closer to the edges of the field image P, images that change on a field by field basis such as telops are often included, which may render the determination of identical images difficult. Accordingly, pixels within an area smaller than a predetermined value in the vicinity of the center of the field image P are read to obtain the correlation value. On the other hand, if the current status is the pull-down pattern recognition status, this means that a pull-down pattern has been successfully detected. Accordingly, for example, as shown in FIG. 5, pixels within an area of b1×b2 (b1>a1, b2>a2) larger than a predetermined value in the vicinity of the center of the field image P are extracted. This is because, since it is already possible to detect a pull-down pattern, it is expected that enlarging the extraction area will not render the determination of identical images difficult. Accordingly, pixels within an area larger than a predetermined value in the vicinity of the center of the field image P are read.

In step S24, the correlation value computing section 13 obtains the sum of absolute pixel differences between supplied pixels to obtain the correlation value of the noted field image, and supplies the correlation value to the break determining section 14. More specifically, the relationship between the noted field image stored in the buffer 11-2, and the field images (reference field images) preceding and following the noted field image stored in the buffers 11-1 and 11-3 is such that if the noted field image is the top field, the preceding and following field images are the bottom fields and, conversely, if the noted field image is the bottom field, the preceding and following field images are the top fields. Thus, the correlation value computing section 13 virtually interpolates a pixel corresponding to a pixel position of the noted field image, by using each of pixels of the preceding and following reference field images.

Figure 6:
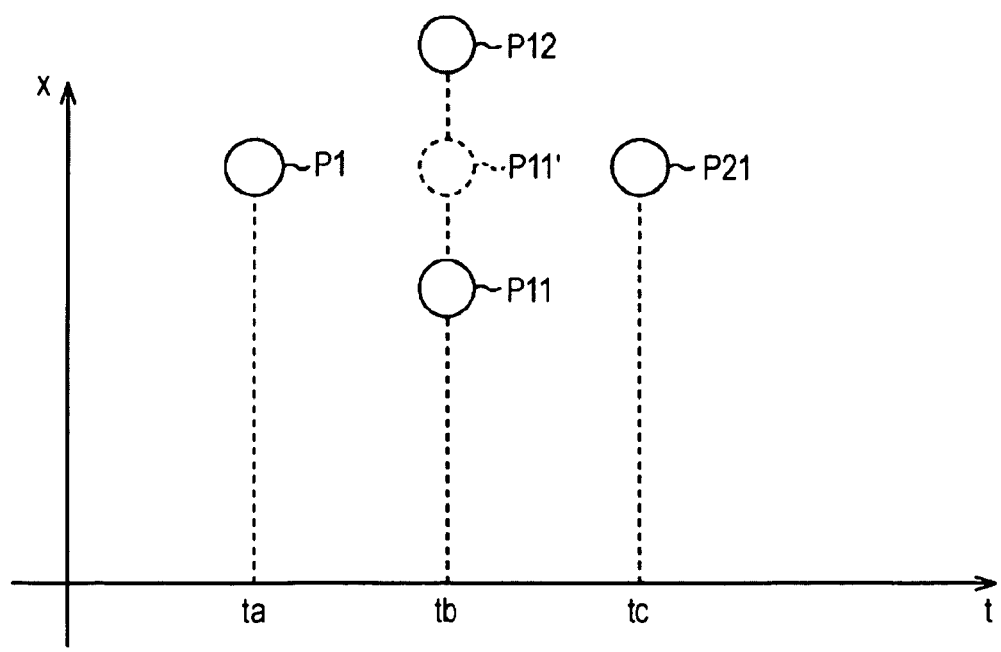
FIG. 6 is a diagram illustrating a correlation value computing process.

That is, for example, as shown in FIG. 6, assuming that the noted field image is the field image at time tb, pixels in the vertical direction are pixels P11 and P12 as counted from the bottom of the drawing, the preceding and following reference field images are respectively the field images at times ta, tc, and their respective pixels are a pixel P1 and a pixel P21, the correlation value computing section 13 interpolates a pixel P11' (=(P12+P11)/2) corresponding to a pixel position of the noted field image, on each of the field images at times ta and tc. Further, the correlation value computing section 13 obtains the absolute values of differences between the obtained pixel 11' and each of the pixels P11 and P12 located at the corresponding positions on the reference field images (|P11'−P1| and |P11'−P21|), and the sums of absolute differences corresponding to every pixel obtained in the same way, that is, the sums of absolute differences are computed as correlation values PR and AR. Further, the absolute difference between pixels P1 and P21 (|P1−P21|) is obtained, and the sum of the absolute differences corresponding to every pixel obtained in the same way, that is, the sum of absolute differences, is computed as a correlation value FR.

It should be noted that in FIG. 6, the horizontal axis represents the direction of time indicating the display timing of each field image, and the vertical axis represents the pixel position in the vertical direction (x direction) of each field image.

The correlation value FR thus obtained is such that when images identical to the immediately preceding image or immediately following image occur successively, the sum of absolute differences in pixel value between pixels becomes small, and when identical images do not occur successively, the sum of absolute differences in pixel value between pixels becomes large. That is, if the noted field image has a high correlation with the preceding and following reference field images, the correlation value FR becomes a small value, and the correlation values PR and AR become roughly the same. Conversely, if the noted field image has a low correlation with the preceding and following reference field images, for example, if the noted field image has a low correlation with the preceding reference field image, the correlation value FR becomes a large value, and the correlation value AR becomes small relative to the correlation value PR.

Correlation values are computed by the above-mentioned process, and are supplied to the break determining section 14.

Figure 3:
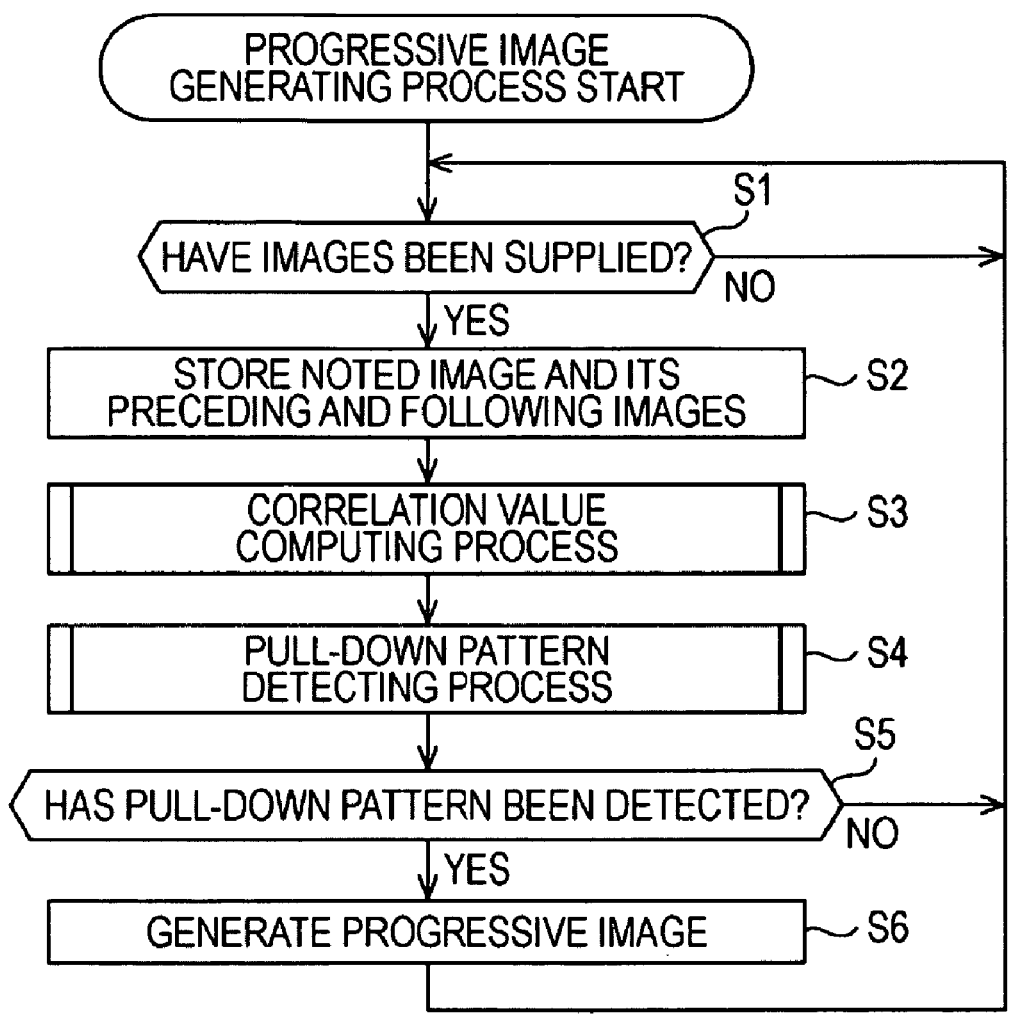
FIG. 3 is a flowchart illustrating a progressive image generating process.

Now, the description will return to the flowchart of FIG. 3.

When correlation values are computed in step S3, a pull-down pattern detecting process is executed in step S4, and a pull-down pattern is detected.

Now, referring to the flowchart in FIG. 7, the pull-down pattern detecting process will be described.

In step S41, the break determining section 14 requests the status management section 20 for status information, and determines whether or not the current status is the pattern detection status or pull-down pattern detection status on the basis of the acquired status information. For example, if the status managed by the status management section 20 and stored in the status storing section 21 is not the pattern detection status or the pull-down pattern detection status but is the undetected status, the processing advances to step S42.

In step S42, the break determining section 14 determines whether or not a noted field image corresponds to a break on the basis of the correlation values PR, AR, and FR supplied from the correlation value computing section 13. For example, in step S42, if it is determined that the correlation value FR is smaller than a predetermined threshold "th", or the correlation value FR is larger than the predetermined threshold "th" but the correlation value AR is not smaller than the correlation value PR, that is, the noted field image is identical to the immediately preceding field image, the processing ends without the status undergoing a transition as indicated by a transition C1 in FIG. 2.

Figure 8:
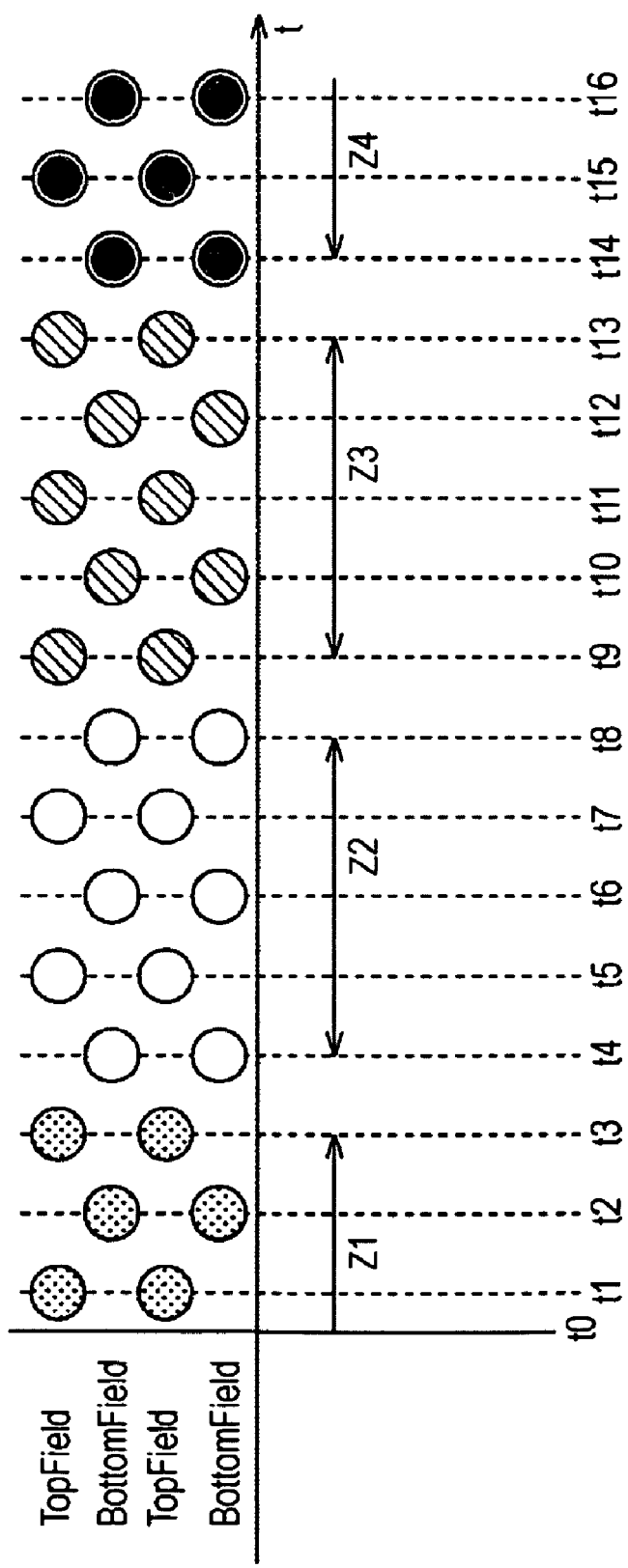
FIG. 8 is a diagram illustrating a pull-down pattern detecting process.

That is, as shown in, for example, FIG. 8, in a case where the processing is started at time t0, for the first several field images, it is not possible to identify the positions of these field images in a pull-down pattern, so the status remains the undetected status.

It should be noted that in FIG. 8, the horizontal axis represents the time axis, and the vertical axis represents the vertical arrangement of pixels on a given horizontal coordinate in a field image at each time. That is, in FIG. 8, the processing is started at time t0, and pixels arranged vertically in corresponding field images at times t1 to t16 are indicated by circles. An example of the vertical arrangement of two pixels in a field image corresponding to the top field (TopField) is shown at each of times t1, t3, t5, t7, t9, t11, t13, and t15, and an example of the vertical arrangement of two pixels in a field image corresponding to the bottom field (BottomField) is shown at each of times t2, t4, t6, t8, t10, t12, t14, and t16. Further, the pixel value of each pixel is indicated by the pattern inside a circle indicating the pixel. Spotted circles, white circles, diagonally shaded circles, and gridded circles are shown in an area Z1 from time t1 to time t3, an area Z2 from time t4 to time t8, an area Z3 from time t9 to time t13, and an area Z4 from time t14 to time t16, respectively. Identical patterns indicate identical pixel values.

Accordingly, if, for example, the noted field image is a field image at time t2, as shown in FIG. 8, the pixel values of pixels of the field image at time t2 are the same as those of pixels of the immediately preceding field image at time 1 and those of pixels of the immediately following field image at time t3. Thus, the correlation value FR remains small and does not become larger than the predetermined threshold "th", so the status remains the undetected status.

If the noted field image is, for example, a field image at time t3, as shown in FIG. 8, pixels of a field image at time t4 differ in pixel value from pixels of a field images at time t2, so the correlation value FR becomes larger than the predetermined threshold "th". However, pixels of the field image at time t3 are the same in pixel value as the pixels of the immediately preceding field image at time t2, and differ in pixel value from the pixels of the immediately following field image at time t4, so the correlation value PR tends to becomes small but the correlation value AR tends to become large. Thus, the correlation value AR does not become smaller than the correlation value PR, so the status remains the undetected status.

On the other hand, in step S42, if, for example, the correlation value FR is larger than the predetermined threshold "th", and the correlation value AR is smaller than the correlation value PR, that is, if the noted field image is different from the immediately preceding field image and hence it is regarded that a break has been detected, in step S43, the break determining section 14 notifies the status management section 20 of the fact that a break has been detected. In response to this processing, as indicated by a transition C2 in FIG. 2, the status management section 20 causes the status to transition from the undetected status to the pattern detection status, and stores the status into the status storing section 21.

That is, if, as shown in FIG. 8, for example, the noted field image is a field image at time t4, for example, pixels of the immediately following field image at time t5 do not have the same pixel values as pixels of the immediately preceding field image at time t3, so the correlation value FR becomes larger than the predetermined value "th". Further, since pixels of the field image at time t4 do not have the same pixel values as the pixels of the immediately preceding field image at time t3, the correlation value PR tends to become large. Also, since the pixels of the field image at time t4 have the same pixel values as the pixels of the immediately following field image at time t5, the correlation value AR tends to become small. Thus, the correlation value AR becomes smaller than the correlation value PR, so it can be recognized that the noted field image is at the top position of a set of successively inputted field images and thus corresponds to a break.

Through this processing, as shown in FIG. 2, the status transitions to the pattern detection status in which the top position of successively inputted field images is recognized, so the counting of a successive occurrence count C can be started when identical field images are successively supplied thereafter.

On the other hand, if it is determined in step S41 that the status is, for example, the pattern detection status or pull-down pattern detection status, in step S44, as in the processing of step S42, the break determining section 14 determines whether or not the noted field image corresponds to a break on the basis of the correlation values PR, AR, and FR supplied from the correlation value computing section 13.

If it is determined in step S44 that the noted field image does not correspond to a break, that is, if field images identical to the immediately preceding field image has been successively inputted, in step S45, the break determining section 14 increments the successive occurrence count C stored in the identical image successive occurrence counter 15 by 1. At this time, as indicated by a transition C3 or C10 in FIG. 2, no status transition takes place, and only the successive occurrence count C is incremented by 1. Therefore, the successive occurrence count C is incremented by 1 at times t5 to t8, or at times t9 to t13 shown in FIG. 8.

In step S46, the threshold management section 14a of the break determining section 14 sets the predetermined threshold "th" in accordance with the successive occurrence count C in the manner as shown in, for example, FIG. 9, and the processing ends. That is, in a case where, for example, state in which there is not much change in inputted field images occurs successively, if the predetermined threshold "th" is set constant in this case, a state in which no break can be detected may continue. Accordingly, as shown in FIG. 9, when a correlation value "dif" has become smaller than a predetermined value "dif1", and it is thus regarded that a state in which there is not much change in image has continued, the predetermined threshold "th" is set anew in accordance with the correlation value "dif". This processing makes it easier to detect a break even when images with little change successively occur.

It should be noted that in FIG. 9, the horizontal axis represents the correlation value "dif", and the vertical axis represents the predetermined threshold "th".

If the difference between field images is somewhat small, it is expected that the noted field image does not correspond to a break. However, depending on the design pattern used, a large correlation value is not always calculated. Accordingly, to determine whether or not a correlation value is large or small, a correlation value previously used for determining a break may be used. That is, generally, it is assumed that the correlation value will decrease when a scene is still. Accordingly, a break may be determined by determining whether or not the current correlation value is large or small by comparison relative to the correlation value at the time of break determination obtained last time.

On the other hand, if it is determined in step S44 that the noted field image corresponds to a break, in step S47, the status management section 20 causes the status to transition to the pattern determining status, and stores the status into the status storing section 21. Through this processing, as indicated by a transition C4 or C9 in FIG. 2, the status transitions to the pattern determining status.

In step S48, the pattern determining section 16 determines whether or not the successive occurrence count C of the identical image successive occurrence counter 15 has matched a set count. The term set count as used herein refers to the number of successive occurrences of identical field images constituting a pull-down pattern. For example, FIG. 8 shows an example of field images inputted in the case of 5-5 pull-down, in which five identical field images are inputted successively from time t4 to t8 and from time t9 to t13, indicating that five identical field images are successively inputted at a time. Therefore, if five identical field images are successively inputted, this can be determined as corresponding to the number of successive field images constituting a 5-3 pull-down pattern. Since the successive occurrence count C represents the number of occurrences of field images that are determined to be identical with the field image at the top of successive field images, if five identical field images are inputted, the identical image successive occurrence counter 15 indicates the successive occurrence count C=4. Thus, in the case of a 5-5 pull-down pattern, the set count is 4.

Likewise, in the case of 2-3 pull-down, identical field images occur in a sequence of 2 field images, 3 field images, and so on, the set count is 1 and 2. Further, in the case of 8-7 pull-down, identical field images occur in a sequence of 8 field images, 7 field images, and so on, so the set count is 7 and 6. In the case of 6-4 pull-down, identical field images occur in a sequence of 6 field images, 4 field images, and so on, so the set count is 5 and 3.

Accordingly, in step S48, in the case of FIG. 8, the successive occurrence count C becomes 4 at time t9, so it is determined that the successive occurrence count C has matched the set count, and the processing advances to step S49.

In step S49, the pattern determining section 16 estimates a pull-down pattern with the matching set count. That is, the pattern determining section 16 estimates a corresponding pull-down pattern from the set count that has matched the successive occurrence count C. In the case of FIG. 8, the successive occurrence count is 4, so it is estimated that the matching pull-down pattern is 5-5 pull-down.

In step S50, the pattern determining section 16 reads a pull-down pattern stored in association with a matching count M stored in the matching counter 19, and determines whether or not the read pull-down pattern matches the estimated pull-down pattern. That is, since a matching pull-down pattern is stored in the matching counter 19 in association with the matching count M, the pattern determining section 16 compares the stored pull-down pattern against the estimated-pull-down pattern to determine whether or not the two match.

If it is determined in step S50 that the pull-down pattern stored in association with the matching count M, and the estimated pull-down pattern match, in step S51, the pattern determining section 16 causes the matching counter 19 to increment the matching count M indicating the number of matchings with the set count by 1 and store the resulting matching count M in association with the estimated pull-down pattern, and notifies the pull-down pattern detecting section 18 of the fact that matching with the set count has occurred.

Accordingly, in the case of FIG. 8, at time t9, the matching count M is incremented by 1 with respect to the 5-5 pull-down. Also, if, for example, the successive occurrence count C is 7 or 6, the pattern determining section 16 increments the matching count M by 1 with respect to the 8-7 pull-down. Further, if, for example, the successive occurrence count C is 5 or 3, the pattern determining section 16 increments the matching count M by 1 with respect to the 6-4 pull-down.

On the other hand, if it is determined in step S50 that the pull-down pattern stored in association with the matching count M, and the estimated pull-down pattern do not match, the pattern determining section 16 resets the matching count M to 1, in step S52, and registers the matching count M in association with the estimated pull-down pattern. That is, the fact that the pull-down pattern stored in association with the matching count M, and the estimated pull-down pattern do not match means that it is highly likely that the pull-down pattern of input images has changed before and after the detection of a break, so the matching count is reset.

In step S53, the pull-down pattern detecting section 18 determines whether or not the matching count M is smaller than a lower limit value. If the matching count M is smaller than the lower limit value, in step S54, the pull-down pattern detecting section 18 notifies the status management section 20 to that effect. Thus, the status management section 20 causes the status to transition to the pattern detection status. That is, as indicated by a transition C5 in FIG. 2, the status transitions from the pattern determination status to the pattern detection status.

On the other hand, if the matching count M is not smaller than the lower limit value in step S53, in step S55, the pull-down pattern detecting section 18 determines whether or not the matching count M is larger than an upper limit value. If the matching count M is larger than the upper limit value, the pull-down pattern detecting section 18 regards this as indicating that matching of the successive occurrence count C of identical field images with a set count has repeatedly occurred for the number of times that makes detection of a pull-down pattern possible, and notifies the status management section 20 to that effect.

In step S56, the status management section 20 causes the status to transition from the pattern determination status to the pull-down pattern recognition status. Through this processing, as indicated by a transition C8 in FIG. 2, the status transitions from the pattern determination status to the pull-down pattern recognition status.

In step S57, the pull-down pattern detection section 18 supplies information on the pull-down pattern stored in association with the matching count stored in the matching counter 19, to the progressive image generating section 22 as information on the pull-down pattern detected from input images.

In step S58, the pull-down pattern detecting section 18 resets the successive occurrence count C stored in the identical image successive occurrence counter 15, and the processing ends.

On the other hand, if the matching count M is not larger than the upper limit value in step S55, that is, if the matching count M is larger than the lower limit value but smaller than the upper limit value, and the number of times identical field images constituting a pull-down pattern have been successively detected is small, in step S59, the pull-down pattern detecting section 18 notifies the status management section 20 of the fact that the matching count M is larger than the lower limit value but smaller than the upper limit value. In response to this notification, the status management section 20 causes the status to transition from the pattern detection status to the suspend status. That is, through a transition C6 in FIG. 2, the status transitions from the pattern detection status to the suspend status.

In step S60, the pull-down pattern detecting section 18 resets the successive occurrence count C of the identical image successive occurrence counter 15 to 0, and notifies the status management section 20 to that effect.

In step S61, on the basis of this notification, the status management section 20 causes the status to transition to the pattern detection status. That is, as indicated by a transition C7 in FIG. 2, the status transitions from the suspend status to the pattern detection status.

Further, in step S48, if the successive occurrence count C of the identical image successive occurrence counter 15 does not match a set count, that is, if the successive occurrence count C does not correspond to a set count for identical field images constituting a pull-down pattern registered in the pull-down pattern storing section 17 in advance, the pull-down pattern in question cannot be detected. Accordingly, in step S62, the pattern determining section 16 initializes all of the successive occurrence count C stored in the identical image successive occurrence counter 15, the matching count M of the matching counter 19, and the predetermined threshold "th" that is managed by the threshold management section 14a in the break determining section 14, and notifies the status management section 20 to that effect.

In step S63, the status management section 20 reads status information stored in the status storing section 21, and causes the status to transition from the pattern determination status to the undetected status. That is, through a transition C11 in FIG. 2, the status transitions from the pattern determination status to the undetected status.

Now, the description will return to the flowchart of FIG. 3.

When the pull-down pattern detecting process is finished in step S4, in step S5, the progressive image generating section 22 determines whether or not a pull-down pattern has been detected. That is, since the pull-down pattern detecting process is a process that is executed for every one field image, a pull-down pattern is not always detected unless the processing is executed in the sequence of steps S41, S44, S47, and S58.

Then, if a pull-down pattern is detected in step S5, in step S6, on the basis of the pull-down pattern, the progressive image generating section 22 converts input images supplied from the buffer 11-3 into a progressive image for display on the display section 2.

On the other hand, if a pull-down pattern is not detected, step S6 is skipped, and the processing returns to step S1, and the subsequent processing is repeated.

The above-described processing can be summarized as follows. That is, for example, in the case of FIG. 8, when detection is' started at time t0, until time t3, the status remains the undetected status, and the processing of steps S41 to S43 in FIG. 7 is repeated. When a break is detected at time t4, the status transitions to the pattern detection status. During the period from time t4 to t8, the processing of steps S41, S44, and S45 is sequentially repeated, so the successive occurrence count C stored in the identical image successive occurrence counter 15 is sequentially incremented. At the timing when a break is detected again at time t9, the status transitions to the pattern determination status. At this time, since the successive occurrence count C matches the set count of 4, as the first processing, the matching count M=1 is stored into the matching counter 19 in association with the 5-5 pull-down.

Further, provided that the lower limit value is 1, and the upper limit value is 2, after the status is temporarily set to the suspend status, the status transitions to the pattern detection status, and during the period from time t10 to time t13, the processing of steps S41, S44, and S45 is repeated. Then, at the timing when a break is detected again at time t14, the status transitions to the pattern determination status. At this time, the successive occurrence count C again matches the set count of 4, so the matching count M is incremented, and the matching count M=2 is stored into the matching counter 19 in association with the 5-5 pull-down.

When the matching count M becomes 2 and thus larger than the upper limit value, the pull-down pattern detecting section 18 supplies a pull-down pattern stored in association with the mounting count M stored in the matching counter 19, to the progressive image generating section 22 as the pull-down pattern of input images.

After time t15, as long as the same pull-down pattern continues, the matching count M continues to become larger every time a break is detected, so a pull-down pattern continues to be detected.

Further, even when a pull-down pattern changes in midstream, a new pull-down pattern is detected again at the point when the matching count M exceeds an upper limit value. Thus, it is possible to continuously detect a pull-down pattern even in the case of an image in which various pull-down patterns dynamically change.

While the foregoing description is directed to a case where the sum of absolute pixel differences between images is used as a correlation value, the correlation value may be any value that can express the correlation between images, and thus other correlation values may be used as well. For example, stream header information of a coded image sequence prior to decoding may be used as a correlation value.

According to the configuration described above, even in the case of an interlaced image created from a progressive image of a low frame rate, rather than creating an interpolated image by interpolation, the original progressive image can be completely reconstructed on the basis of detected pull-down patterns, thereby making it possible to realize enhanced image quality.

Since it is possible to continue the detection of a pull-down pattern even when a change in frame rate occurs, it is possible to suppress degradation of image quality that occurs during the period after detection of a pull-down pattern is finished temporarily until a pull-down pattern is detected again.

Further, at locations where the scene changes or some editing might have been done, if the pull-down pattern changes and appropriate processing becomes difficult, the processing is suspended. Thus, it is possible to suppress image quality degradation such as a combing phenomenon which occurs when the original progressive image is mistakenly reconstructed from different field images.

Further, even if there is not much change in the original image, and the correlation value between design patterns is so small that makes it difficult to distinguish from noise, a predetermined threshold with respect to the correlation value is dynamically changed in accordance with the number of successive occurrences in which field images are detected as being identical. Thus, detection can be continued with good accuracy even with respect to a minute correlation value typical of an animation. Further, it is possible to suppress image quality degradation due to combing typically observed in the case of minute variations, or an interpolation process, thereby achieving enhanced image quality.

Further, since detection can be maintained even when perfect correlation does not occur in the original image, detection can be maintained when the design pattern changes thereafter. It is thus possible to maintain high-quality video.

Since a minimum of three field images suffices to perform detection of all pull-downs, the capacity of a frame memory can be made minimum. It should be noted that while the foregoing description is directed to a case where three field images are used, a greater number of field images may be used. Further, frame images may be used instead of field images.

Further, since a plurality of pull-down patterns are all detected at once, there is no need to provide a processing system or circuitry for every pull-down pattern, thus allowing a reduction in throughput or circuit scale.

According to the configuration described above, pull-down patterns can be detected by means of a single process configuration with respect to input images of various frame rates, thereby making it possible to reconstruct the original progressive image with high accuracy from input images on the basis of the detected pull-down patterns.

While the series of processes described above can be executed by hardware, it can be also executed by software. If the series of processes is to be executed by software, a program constituting the software is installed from a program recording medium to a computer embedded in dedicated hardware, a general purpose personal computer capable of executing various functions when installed with various programs, for example, or the like.

FIG. 10 shows an example of the configuration of a general-purpose computer. This personal computer has a CPU (Central Processing Unit) 1001 built therein. An input/output interface 1005 is connected to the CPU 1001 via a bus 1004. A ROM (Read Only Memory) 1002 and a RAM (Random Access Memory) 1003 are connected to the bus 1004.

Connected to the input/output interface 1005 is an input section 1006 formed by an input device such as a keyboard or a mouse with which the user inputs an operation command, an output section 1007 that outputs a processing operation screen and an image of processing results to a display device, a storage section 1008 formed by a hard disc drive or the like that stores programs and various kinds of data, and a communication section 1009 that is formed by a LAN (Local Area Network) adapter or the like and executes a communication process via a network represented by the Internet. Also connected to the input/output interface 1005 is a drive 1010 that reads/writes data from/to a removable medium 1011 such as a magnetic disc (including a flexible disc), an optical disc (including a CD-ROM (Compact Disc-Read Only Memory) and a DVD (Digital Versatile Disc)), a magneto-optical disc (including an MD (Mini-Disc)), or a semiconductor memory.

The CPU 1001 executes various kinds of processing in accordance with a program stored in the ROM 1002, or a program that is read from the removable medium 1011 such as a magnetic disc, an optical disc, a magneto-optical disc, or a semiconductor memory and installed into the storage section 1008, and is then loaded into the RAM 1003 from the storage section 1008. Data and the like necessary for the CPU 1001 to execute various kinds of processing are also stored in the RAM 1003 as appropriate.

It should be noted that in this specification, the steps describing the program recorded on the recording medium include not only processes that are executed time sequentially in the order as they appear in the description, but also processes that are not executed time sequentially but executed in parallel or independently.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   correlation value computing means for computing a correlation value between a noted image and each of reference images preceding and following the noted image, among successively inputted images;
   break determining means for determining whether or not the noted image corresponds to a break in a predetermined number of successive identical images, on the basis of the correlation value;
   successive occurrence counting means for cumulatively counting successive occurrences of identical images as a successive occurrence count, if it is not determined that the noted image corresponds to a break;
   pattern determining means for determining whether or not a successive occurrence count up to an immediately preceding image matches a set count indicating a successive occurrence count corresponding to a predetermined pull-down pattern, if it is determined that the noted image corresponds to a break;
   matching counting means for counting a number of times matching with the predetermined pull-down pattern occurs as a matching count, if it is determined that the noted image corresponds to a break, and it is determined that the successive occurrence count up to the immediately preceding image matches the set count; and
   pull-down pattern detecting means for detecting the predetermined pull-down pattern corresponding to the set count as a pull-down pattern of the successively inputted images, if it is determined that the noted image corresponds to a break, and it is determined that the successive occurrence count up to the immediately preceding image matches the set count and that the matching count is larger than a predetermined count.

2. The image processing apparatus according to claim 1, further comprising:
   progressive image generating means for generating a progressive image from the successively inputted images, on the basis of the pull-down pattern of the successively inputted images detected by the pull-down pattern detecting means.

3. The image processing apparatus according to claim 1, wherein:
   if it is determined that the noted image corresponds to a break, the pull-down pattern detecting means suspends detection of the predetermined pull-down pattern if it is determined that the successive occurrence count up to the immediately preceding image matches the set count, and the matching count is not larger than a predetermined count and is larger than another predetermined count smaller than the predetermined count.

4. The image processing apparatus according to claim 1, wherein:
   the break determining means determines whether or not the noted image corresponds to a break in a predetermined number of successive identical images, on the basis of whether or not the correlation value is larger than a predetermined threshold, or a comparison result between correlation values.

5. The image processing apparatus according to claim 4, further comprising:
   threshold management means for managing the predetermined threshold so as to become smaller in accordance with the successive occurrence count.

6. The image processing apparatus according to claim 1, wherein:
   the correlation value computing means computes a correlation value between pixels in a first area in the vicinity of the center of each of the noted image and the reference images preceding and following the noted image, among successively inputted images;
   the correlation value computing means computes a correlation value between pixels in a second area that is larger than the first area and is in the vicinity of the center of each of the noted image and the reference images preceding and following the noted image, among successively inputted images, in a state when the pull-down pattern detecting means is able to detect the predetermined pull-down pattern.

7. An image processing method, performed by a computer, comprising the steps of:
   computing a correlation value between a noted image and each of reference images preceding and following the noted image, among successively inputted images;
   determining whether or not the noted image corresponds to a break in a predetermined number of successive identical images, on the basis of the correlation value;
   cumulatively counting successive occurrences of identical images as a successive occurrence count, if it is not determined that the noted image corresponds to a break;
   determining whether or not a successive occurrence count up to an immediately preceding image matches a set count indicating a successive occurrence count corresponding to a predetermined pull-down pattern, if it is determined that the noted image corresponds to a break;
   counting a number of times matching with the predetermined pull-down pattern occurs as a matching count, if it is determined that the noted image corresponds to a break, and it is determined that the successive occurrence count up to the immediately preceding image matches the set count; and
   detecting the predetermined pull-down pattern corresponding to the set count as a pull-down pattern of the successively inputted images, if it is determined that the noted image corresponds to a break, and it is determined that the successive occurrence count up to the immediately preceding image matches the set count and that the matching count is larger than a predetermined count.

8. The image processing method of claim 7, further comprising the step of:
   generating a progressive image from the successively inputted images, on the basis of the detected pull-down pattern of the successively inputted images.

9. The image processing method of claim 7, further comprising the step of:
   if it is determined that the noted image corresponds to a break, suspending detection of the predetermined pull-down pattern if it is determined that the successive occurrence count up to the immediately preceding image matches the set count, and the matching count is not larger than a predetermined count and is larger than another predetermined count smaller than the predetermined count.

10. The image processing method of claim 7, further comprising the step of:
    determining whether or not the noted image corresponds to a break in a predetermined number of successive identical images, on the basis of whether or not the correlation value is larger than a predetermined threshold, or a comparison result between correlation values.

11. The image processing method of claim 10, further comprising the step of:
    managing the predetermined threshold so as to become smaller in accordance with the successive occurrence count.

12. The image processing method of claim 7, further comprising the steps of:
    computing a correlation value between pixels in a first area in the vicinity of the center of each of the noted image and the reference images preceding and following the notes image, among successively inputted images; and
    computing a correlation value between pixels in a second area that is larger than the first area and is in the vicinity of the center of each of the noted image and the reference images preceding and following the noted image, among successively inputted images, in a state when the predetermined pull-down pattern is detectable.

13. A non-transitory computer readable medium storing a program for causing a computer to execute a process comprising the steps of:
    computing a correlation value between a noted image and each of reference images preceding and following the noted image, among successively inputted images;
    determining whether or not the noted image corresponds to a break in a predetermined number of successive identical images, on the basis of the correlation value;
    cumulatively counting successive occurrences of identical images as a successive occurrence count, if it is not determined that the noted image corresponds to a break;
    determining whether or not a successive occurrence count up to an immediately preceding image matches a set count indicating a successive occurrence count corresponding to a predetermined pull-down pattern, if it is determined that the noted image corresponds to a break;
    counting a number of times matching with the predetermined pull-down pattern occurs as a matching count, if it is determined that the noted image corresponds to a break, and it is determined that the successive occurrence count up to the immediately preceding image matches the set count; and detecting the predetermined pull-down pattern corresponding to the set count as a pull-down pattern of the successively inputted images, if it is determined that the noted image corresponds to a break, and it is determined that the successive occurrence count up to the immediately preceding image matches the set count and that the matching count is larger than a predetermined count.

14. An image processing apparatus comprising:
a correlation value computing section that computes a correlation value between a noted image and each of reference images preceding and following the noted image, among successively inputted images;
a break determining section that determines whether or not the noted image corresponds to a break in a predetermined number of successive identical images, on the basis of the correlation value;
a successive occurrence counting section that cumulatively counts successive occurrences of identical images as a successive occurrence count, if it is not determined that the noted image corresponds to a break;
a pattern determining section that determines whether or not a successive occurrence count up to an immediately preceding image matches a set count indicating a successive occurrence count corresponding to a predetermined pull-down pattern, if it is determined that the noted image corresponds to a break;
a matching counting section that counts a number of times matching with the predetermined pull-down pattern occurs as a matching count, if it is determined that the noted image corresponds to a break, and it is determined that the successive occurrence count up to the immediately preceding image matches the set count; and
a pull-down pattern detecting section that detects the predetermined pull-down pattern corresponding to the set count as a pull-down pattern of the successively inputted images, if it is determined that the noted image corresponds to a break, and it is determined that the successive occurrence count up to the immediately preceding image matches the set count and that the matching count is larger than a predetermined count.

15. The image processing apparatus of claim 14, further comprising:
progressive image generating section that generates a progressive image from the successively inputted images, on the basis of the pull-down pattern of the successively inputted images detected by the pull-down pattern detecting section.

16. The image processing apparatus of claim 14, wherein:
if it is determined that the noted image corresponds to a break, the pull-down pattern detecting section suspends detection of the predetermined pull-down pattern if it is determined that the successive occurrence count up to the immediately preceding image matches the set count, and the matching count is not larger than a predetermined count and is larger than another predetermined count smaller than the predetermined count.

17. The image processing apparatus of claim 14, wherein:
the break determining section determines whether or not the noted image corresponds to a break in a predetermined number of successive identical images, on the basis of whether or not the correlation value is larger than a predetermined threshold, or a comparison result between correlation values.

18. The image processing apparatus of claim 17, further comprising:
a threshold management section that manages the predetermined threshold so as to become smaller in accordance with the successive occurrence count.

19. The image processing apparatus of claim 14, wherein:
the correlation value computing section computes a correlation value between pixels in a first area in the vicinity of the center of each of the noted image and the reference images preceding and following the noted image, among successively inputted images;
the correlation value computing section computes a correlation value between pixels in a second area that is larger than the first area and is in the vicinity of the center of each of the noted image and the reference images preceding and following the noted image, among successively inputted images, in a state when the predetermined pull-down pattern is detectable.

* * * * *